G. B. HAMLIN
Improvement in Belt-Gearing.
No. 131,268.            Patented Sep. 10, 1872.
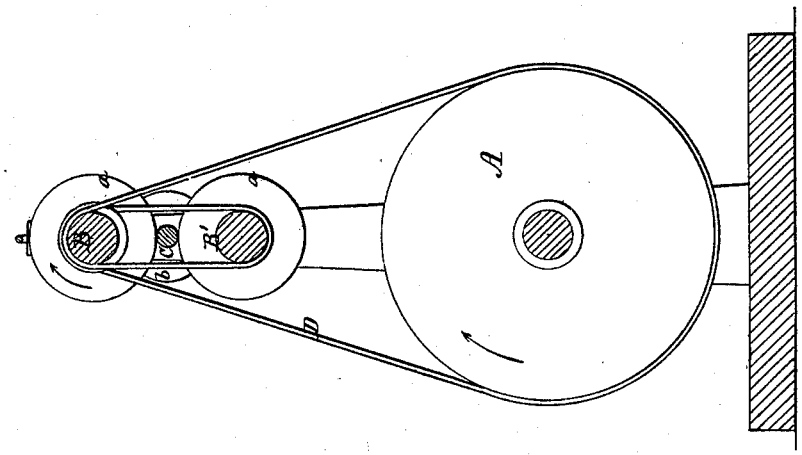
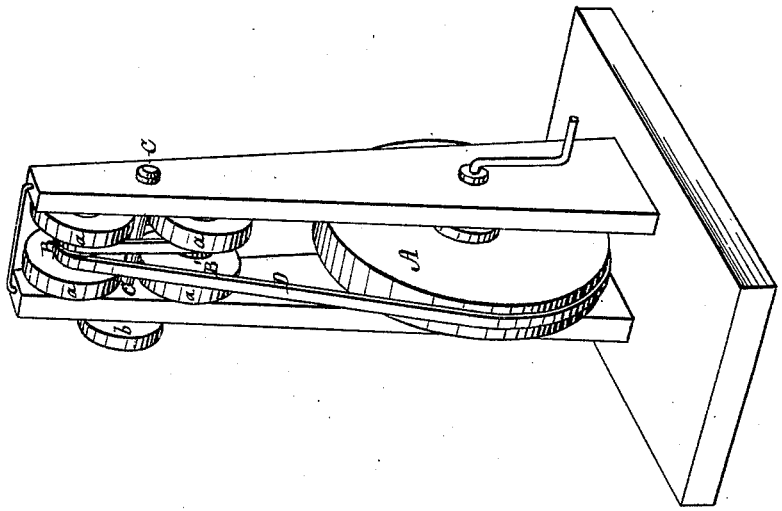

UNITED STATES PATENT OFFICE.

GEORGE B. HAMLIN, OF WILLIMANTIC, CONNECTICUT.

IMPROVEMENT IN BELT-GEARINGS.

Specification forming part of Letters Patent No. 131,268, dated September 10, 1872.

*To all whom it may concern:*

Be it known that I, GEORGE B. HAMLIN, of Willimantic, in the county of Windham and State of Connecticut, have invented a certain new and useful Improvement in Belt-Gearing.

My improvement relates to that class of belt-gear in which power is communicated to the driven shaft by the peripherical contact therewith of the faces of pulleys, which are connected together and driven by belting. My invention consists in the novel combination of a main driving-pulley, two auxiliary driving-pulleys, and a driven shaft, by means of which, when the main pulley is revolved in any given direction, both of the auxiliary pulleys will revolve in a corresponding direction, and, by the frictional contact of their faces with the driven shaft which is interposed between them, revolve the same at a high rate of speed in an opposite direction without generating undue or objectionable heat at or adjacent to its bearing-surfaces; and I do hereby declare that the following specification, taken in connection with the drawing furnished and forming a part of the same, is a clear and accurate description of an apparatus embodying my invention.

Referring to the drawing, Figure 1 represents, in perspective, a grinding apparatus involving my invention. Fig. 2 represents the same in vertical section.

A denotes the main driving-pulley. It is represented, in this instance, as if mounted on a shaft provided with a crank, and adapted to be driven by hand, as in the case of numerous so-called "hand-powers," for the purpose of driving light circular saws and for other analogous purposes. B and B' denote the two auxiliary driving-pulleys, which are of equal diameter and considerably smaller than the main pulley. Their several axles occupy truly parallel lines, and the bearings of the intermediate auxiliary driving-pulley B' should preferably occupy the same line on which the bearings of the pulley B and main driving-pulley A are located. In this instance each of the auxiliary driving-pulleys is provided with two peripherical bearing surfaces or faces, *a a*, and the belt-surface is located between them. C denotes the driven shaft, on which is represented a small grinding-wheel, *b*. D denotes the belt, which extends from beneath the main driving-pulley A over the upper surface of the auxiliary driving-pulley B; thence down under the auxiliary pulley B'; thence upward again over the pulley B; and thence to the opposite side of the main driving-pulley. On turning the main driving-pulley the auxiliary pulleys are revolved in the same direction, and, by their peripherical contact with the driven shaft C, or with a pulley or pulleys mounted thereon, cause the same to revolve in an opposite direction. The auxiliary driving-pulleys are represented with two peripherical bearing-faces, of a novel character, located on each side of the belt-surface. When a horizontal shaft is to be driven (as, for instance, like that shown in the drawing) these double bearing-surfaces serve to carry it with great steadiness, and practically obviate the necessity of accurately-fitted bearings for that shaft. Should the driven shaft be vertically mounted, as in the case of a spindle, and a step be provided therefor, a single bearing-surface on each pulley may be employed with satisfactory results. The driven shaft, when horizontal, is sustained wholly by the auxiliary driving-pulley B'; and as it is always in close frictional contact with the coincident faces of the auxiliary pulleys, it has no capability of movement independent of them, and therefore requires no accurately-fitted bearings of its own, as has heretofore been essential in shafting or arbors driven at a high rate of speed. As a means of preventing any possible lateral movement of the driven shaft, adjustable guides may be employed, which should lightly bear against the periphery of the driven shaft at the two points which are at right angles to the line of the frictional points of contact with the auxiliary pulleys; or, if desired, adjustable friction-rollers may be satisfactorily employed as guides. The draft of the belt continually serves to evenly draw the two auxiliary driving-pulleys into contact with the driven shaft. Although a flat belt is represented in the drawing, it is optional to employ a round belt or rope. In most cases the belt-surface of pulley B should be subdivided, as shown, so as to prevent the rubbing contact of the adjacent surfaces of the belt. Any of the well-known belt-tightening devices may be readily applied, if necessary.

I am aware that it is not new to drive shafting or arbors by the frictional contact therewith of one or two or more pulleys connected and driven by belting, for such may be seen variously applied in apparatus previously patented by me; but I am not aware that prior to my present invention a driven shaft has ever been arranged to receive frictional contact from the peripherical surfaces of two auxiliary driving-pulleys which were driven in the same direction with and by a main driving-pulley, and connected therewith by a continuous length of belting. By my novel combination and arrangement a rapid multiplication of speed may be attained and applied to the driven shaft or arbor without objectionable friction at any of its bearing-surfaces. The power as applied to the driven shaft is uniform and at exactly opposite points, and by the peculiar draft of the belt from the lower auxiliary pulley over the upper it is practically impossible for the belt to slip at all save at the main pulley, which can seldom occur owing to the great belting-surface thereon. I am also not aware that, prior to my present invention, a driven shaft has ever been interposed between the frictional faces of coincident pulleys which were provided with separate bearing-surfaces on each side of the belt-surface. By having the bearing-surfaces as shown and described the auxiliary pulleys are drawn evenly into contact at two different longitudinal points on the arbor, and obviate thereby any possibility of uneven draft by the belting, which has a central bearing-surface midway between the two frictional surfaces.

I therefore claim as new and of my own invention, to be secured by Letters Patent—

1. The main driving-pulley and the two auxiliary driving-pulleys, connected by a continuous length of belting, in combination with a driven shaft or arbor provided with frictional surfaces, and arranged between the coincident faces of the auxiliary pulleys, substantially as and for the purposes specified.

2. The driving-pulleys B and B', provided with frictional faces parallel with their axes and intermediate belt-surfaces, in combination with a driven arbor arranged to receive frictional contact evenly from the frictional faces on each side of the belting, substantially as described.

GEORGE B. HAMLIN.

Witnesses:
HENRY F. ROYCE,
JOEL R. ARNOLD.